UNITED STATES PATENT OFFICE.

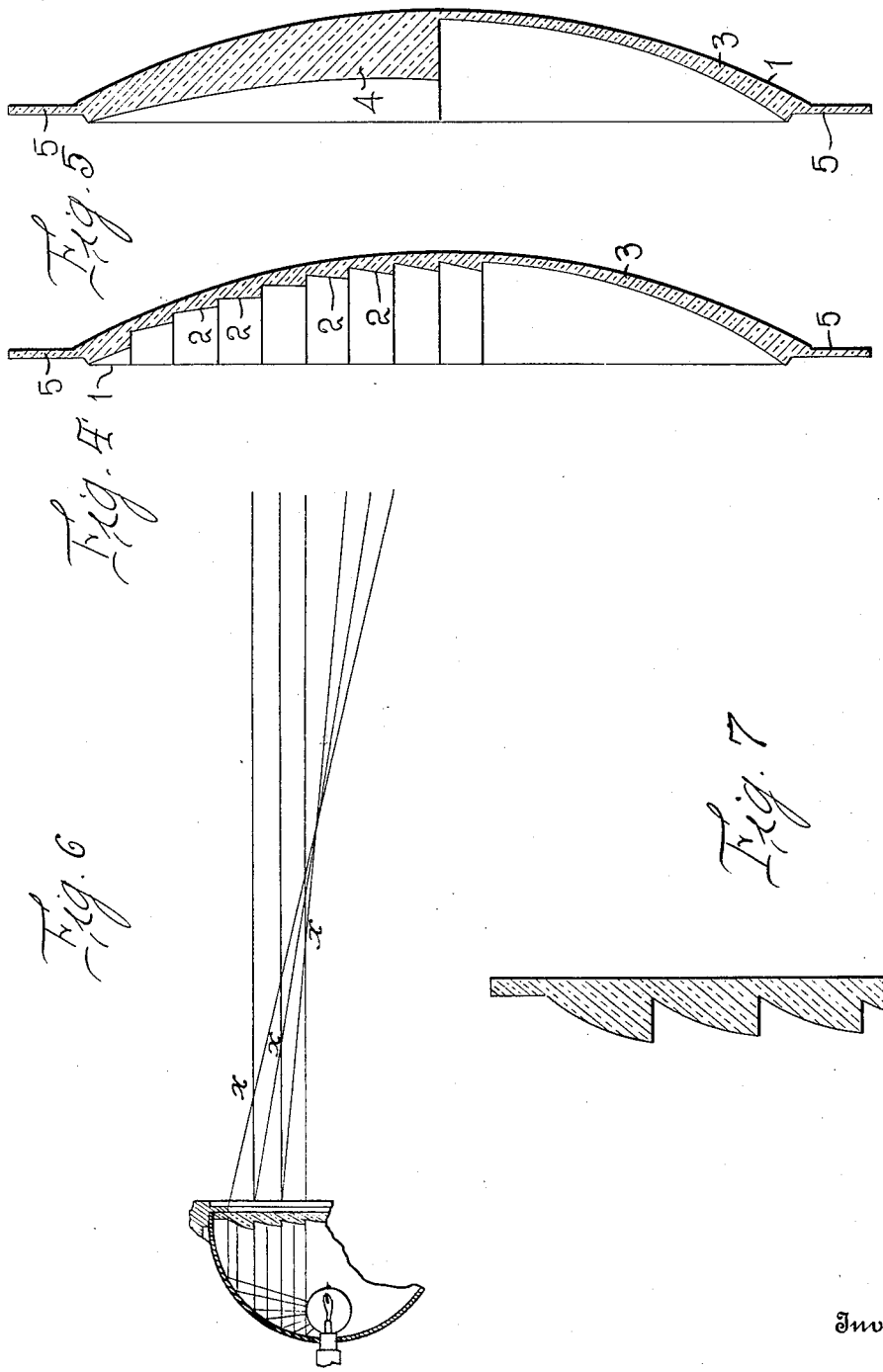

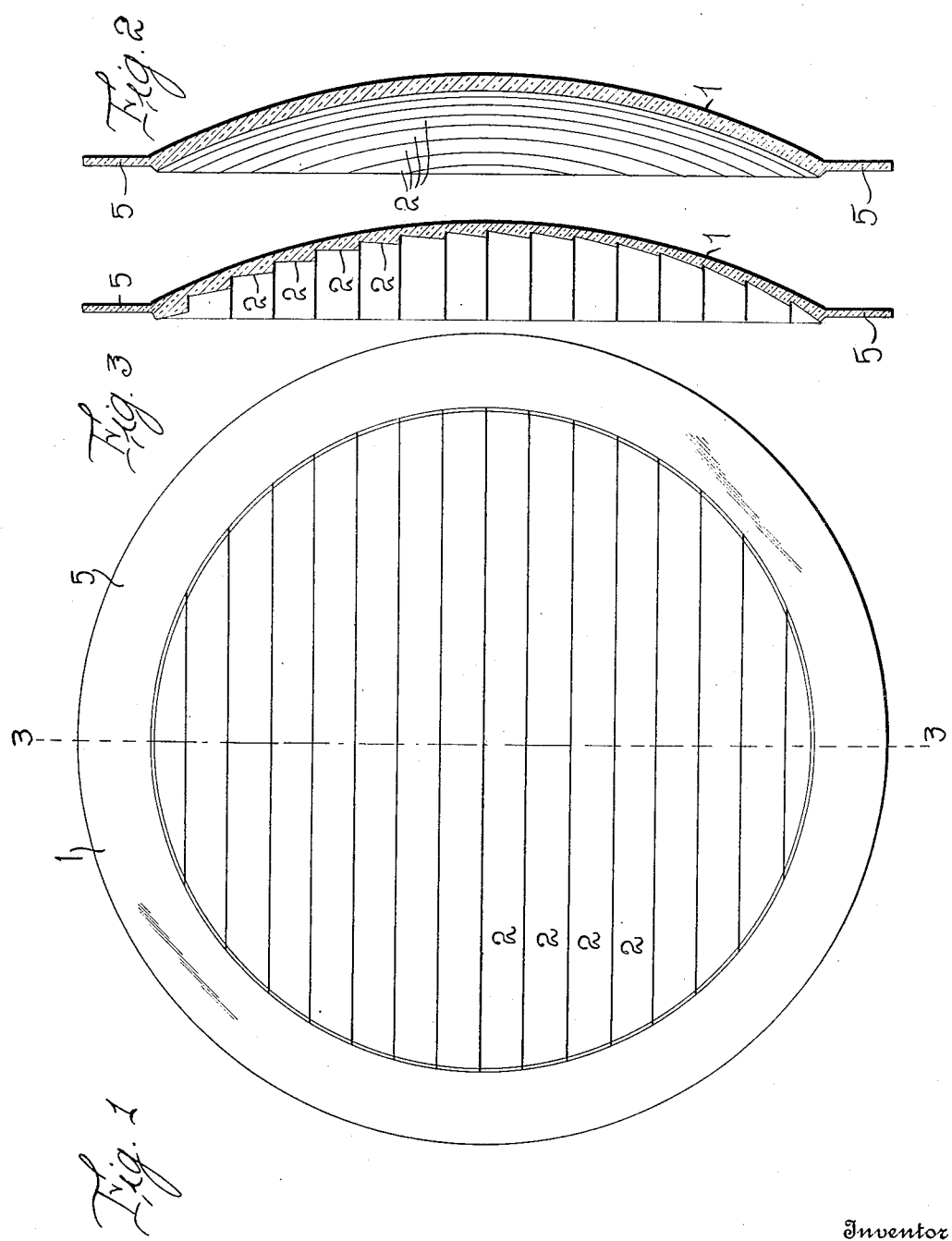

WILLIAM H. ZORGER, OF CHAMPAIGN, ILLINOIS.

HEADLIGHT-LENS.

1,246,216.  Specification of Letters Patent.  Patented Nov. 13, 1917.

Application filed December 15, 1916. Serial No. 137,230.

*To all whom it may concern:*

Be it known that I, WILLIAM H. ZORGER, a citizen of the United States, residing at Champaign, in the county of Champaign and State of Illinois, have invented certain new and useful Improvements in Headlight-Lenses, of which the following is a specification.

This invention relates to vehicle lamps, primarily for automobiles, trolley cars and locomotives and refers more particularly to the lens construction, being a refracting lens intended to be substituted for the common plane glass fronts now commonly used in all head lights having the parabola reflectors. Head lights for automobiles, locomotives, trolley cars and other conveyances as commonly constructed are provided with parabolic or spherical mirrors behind the source of light. The rays coming from such a light while approximately parallel are caused to slightly diverge in all directions so as to give a wider field of illumination by reason of the source of light being between the focus and the mirror. This flaring in all directions serves to illuminate the ground and obstructions on the road both at the right and left and also straight ahead, but it results in those rays which have an upward direction being wasted. Not only are such rays wasted but a positive disadvantage is produced in the blinding effects caused to pedestrians or occupants of vehicles in front of the head light. It is true that the modern head light has a focusing adjustment so as to render all rays parallel or almost so but this concentration of the rays serves to illuminate an insufficient area of the road or track to enable the operator or driver to observe obstacles in time to avoid the same and is subject to the further objection of producing too great a contrast between the illuminated and un-illuminated portions of the track.

The object of my invention is to provide means for deflecting the divergent rays from the upper half of the head light reflector downward onto the road and spreading them out over a considerable space, thus making an even illumination instead of throwing them all on the ground in a four or five inch space forwardly as prisms will do. The rays after passing through a section of the cylinder are focused at the diopter length of the cylinder; those passing through the top of the section pass forward on the same downward angle and strike the ground far in advance of the rays which pass through the same section lower down than this. By the top rays being refracted more than the middle and the middle more than the bottom rays, it produces a crossing of the rays at the focal distance of each cylinder and of course produces a wide forward spreading of the rays, or in other words, a spreading along the ground in the direction in which the vehicle is moving.

The lateral rays are not interfered with, but by adjusting the bulb of the reflector as far back as possible, placing it close to the back of the parabola, the rays will all be very divergent and the lateral rays will be spread sufficiently to illuminate a broad field, while by using cylinders of proper focal strength in the upper half of the lens, all vertical rays will be reduced below the horizontal and spread forwardly along the ground as previously described.

In the accompanying drawings:—

Figure 1 is a front elevation of the preferred form of my head light lens, as it appears when looking into the lamp from the front.

Fig. 2 is a horizontal section, taken through the center of the lens.

Fig. 3 represents a vertical transverse section, taken on line 3—3 of Fig. 1.

Fig. 4 represents another form in which my lens may be made.

Fig. 5 is a view similar to Fig. 3 of another more simple form.

Fig. 6 is a diagrammatic view, showing how the rays of light are brought to a focus at "X" and spread downward, the rays from the upper part of the section striking the ground much sooner than the central rays and the latter much sooner than the bottom rays, and Fig. 7 is a fragmentary view of a portion of the lens, with the parts shown on an enlarged scale.

Referring to the drawings for a more particular description of the invention, 1 indicates the lens, which as shown in the preferred form of my invention illustrated in Figs. 1 to 3, inclusive, is composed of many sections, as 2, of plano-convex cylinders arranged horizontally which will cause all upwardly extending rays to be deflected downward below the horizontal, thus killing the glare from the head light. The glass is of the same or uniform thickness in horizontal section, as shown in Fig. 2, in the preferred form, and the many cylinders will have no action on the lateral rays.

The respective cylinders 2 of the lens may be ½ inch in width plane convex about 5 diopter strength from below to ½ inch below center of lens, where I increase to 7 and ½ diopter. Then ½ inch above center the cylinder is 10 diopter strength and the next section 12 and ½ diopter while all sections above that are about 15 D. Lens made of sectional cylinders as I have described with all axes arranged horizontally will make a very good lens for most head lights but as the parobolic reflectors are very imperfect, I do not wish to be confined to the measurements given above either in the strength or heights of the cylinders.

Fig. 7 is a diagrammatic view, showing how the rays of light are brought to a focus at "X" and spread downward, the rays from the upper part of the section striking the ground much sooner than the central rays and the central rays much sooner than the bottom rays. This makes a forward spread of the rays passing through the cylinder much better than rays passing through the same surface of prisms. In the prism the rays would not be appreciably spread while with my lens, the rays are spread in a forward direction over several feet from each section, thus giving a most perfect illumination.

Fig. 4 represents another form in which my lens may be made, and in which only a little more than the top or upper half is made in sections as in the preferred form and the bottom portion, as 5, made plain.

Fig. 5 represents a still more simple way in which the lens may be made and in which the top or upper half, as 4, is made plain as well as the bottom half, but is of gradually increased thickness from the top to the bottom, or in other words, commencing at the top.

The lens is provided at its edge or perimeter with an annular flange 5, the purpose of which is evident.

My construction of lens is adaptable to any head light. It enables the casing, the light and the mirror to all be held in their natural positions while the light is all deflected toward the ground. Moreover the light is caused to strike the ground at varying distances in advance of the vehicle and is spread forwardly over more space, whereby the road is more equally illuminated.

There is accordingly a more effective illumination than is possible to be obtained from any of the various prismatic lenses; also a much better result than if the ordinary head light were bodily tipped forward sufficiently to throw all the rays to the ground to prevent head light glare resulting in dazzle. Such tipping of the ordinary head light would give an unnecessary illumination to the ground directly in front of the vehicle and would necessitate an awkward position of the head light. My lens gives the whole illumination just where it is desired so that not only is the illumination more effective in itself but is prevented from being a source of annoyance and danger by shining in the eyes of pedestrians and people in approaching vehicles.

Having thus described my invention, what I claim as new and desire to secure by Letters Patent, is:—

1. A transparent lens formed on one surface with a plurality of horizontally arranged focusing cylinder segments.

2. A transparent lens formed on one surface with a plurality of horizontally arranged cylinder segments, each having one face curved in the arc of a circle.

3. A transparent lens formed on one surface with a plurality of focusing cylinder segments having one face curved in the arc of a circle.

4. A transparent lens formed on one face with a plurality of cylinder segments of gradually decreasing strength from the top whose foci are at varying distances from the lens.

5. A transparent lens formed on one face with a plurality of focusing cylinder segments of gradually decreasing strength from the top of the lens whose foci are at varying distances from the lens.

6. A transparent lens formed on its inner surface with a plurality of cylinder segments of different strength whose foci are at varying distances from the lens, depending on the diopter strength of the respective cylinder segments, said cylinder segments having one face formed on the arc of a circle.

In testimony whereof I affix my signature in the presence of a witness.

WILLIAM H. ZORGER.

Witness:
　BEN M. PRICE.